US012438222B2

(12) United States Patent
Pitre et al.

(10) Patent No.: US 12,438,222 B2
(45) Date of Patent: Oct. 7, 2025

(54) BATTERY MODULE

(71) Applicant: Lilium eAircraft GmbH, Wessling (DE)

(72) Inventors: Ryan Pitre, Wessling (DE); Angel Plaza, Wessling (DE); Joerg Weber, Wessling (DE); Gerd Fritsch, Wessling (DE); Jason Dunthorn, Wessling (DE); Felix Scheile, Wessling (DE); Armin Ader, Wessling (DE); Stefan Kneissl, Wessling (DE); Pradeep Pulipaka, Wessling (DE); Marina Leal, Wessling (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 17/673,975

(22) Filed: Feb. 17, 2022

(65) Prior Publication Data

US 2022/0328918 A1 Oct. 13, 2022

(30) Foreign Application Priority Data

Feb. 19, 2021 (EP) .................. 21158236.6

(51) Int. Cl.
*H01M 50/211* (2021.01)
*H01M 10/658* (2014.01)
*H01M 50/342* (2021.01)

(52) U.S. Cl.
CPC ....... *H01M 50/211* (2021.01); *H01M 10/658* (2015.04); *H01M 50/3425* (2021.01); *H01M 2220/20* (2013.01)

(58) Field of Classification Search
CPC ........... H01M 50/211; H01M 50/3425; H01M 50/229; H01M 50/231; H01M 50/233;
(Continued)

(56) References Cited

U.S. PATENT DOCUMENTS

2003/0017383 A1* 1/2003 Ura ................... H01M 10/6555
429/157
2004/0058233 A1 3/2004 Hamada et al.
(Continued)

FOREIGN PATENT DOCUMENTS

CN 107732086 A * 2/2018
DE 102018121545 A1 * 3/2020 .......... H01M 10/613
(Continued)

OTHER PUBLICATIONS

English translation of Kellner et al. (DE-2018121545-A1). (Year: 2020).*
(Continued)

*Primary Examiner* — Jonathan G Leong
*Assistant Examiner* — Drew C Newman
(74) *Attorney, Agent, or Firm* — Meunier Carlin & Curfman LLC

(57) ABSTRACT

A battery module for a vehicle, in particular for an aircraft, comprises two end plates and a cell stack comprising an arrangement of several interconnected battery cells, in particular pouch cells, that are arranged in a row along a stacking direction, wherein the cell stack is sandwiched between the two end plates in the stacking direction, wherein the battery module further comprises a separate tube-like enclosure comprising a heat insulating material, the tube-like enclosure having a front opening and a back opening that are closed by the end plates, so that the tube-like enclosure and the two end plates form a housing in which the cell stack is accommodated.

12 Claims, 7 Drawing Sheets

(58) Field of Classification Search
CPC . H01M 50/30; H01M 10/658; H01M 2220/20
See application file for complete search history.

(56) References Cited

U.S. PATENT DOCUMENTS

| | | | |
|---|---|---|---|
| 2005/0170238 A1* | 8/2005 | Abu-Isa | H01M 50/342 |
| | | | 429/82 |
| 2010/0183910 A1* | 7/2010 | Nishino | H01M 10/0431 |
| | | | 429/163 |
| 2017/0309877 A1* | 10/2017 | Wu | H01M 50/229 |
| 2018/0123198 A1* | 5/2018 | Fees | F28F 11/00 |
| 2019/0181407 A1 | 6/2019 | Harris et al. | |
| 2019/0315217 A1* | 10/2019 | Hohm | B62D 25/20 |
| 2020/0403199 A1 | 12/2020 | Sakurai | |
| 2021/0249712 A1* | 8/2021 | Lee | H01M 10/6563 |

FOREIGN PATENT DOCUMENTS

| | | | | |
|---|---|---|---|---|
| EP | 2 343 752 A2 | 7/2011 | | |
| WO | 20160131141 A1 | 8/2016 | | |
| WO | WO-2019031170 A1 * | 2/2019 | | H01M 2/10 |

OTHER PUBLICATIONS

English translation of Shao et al. (CN-107732086-A). (Year: 2018).*
English translation of Ishibashi et al. (WO-2019031170-A1). (Year: 2019).*
European Search Report for EP 21 158 236.6. Mailed Jul. 20, 2021. 9 pages.
International Search Report and Written Opinion issued for Application No. PCT/EP2022/052740, dated May 6, 2022.

* cited by examiner

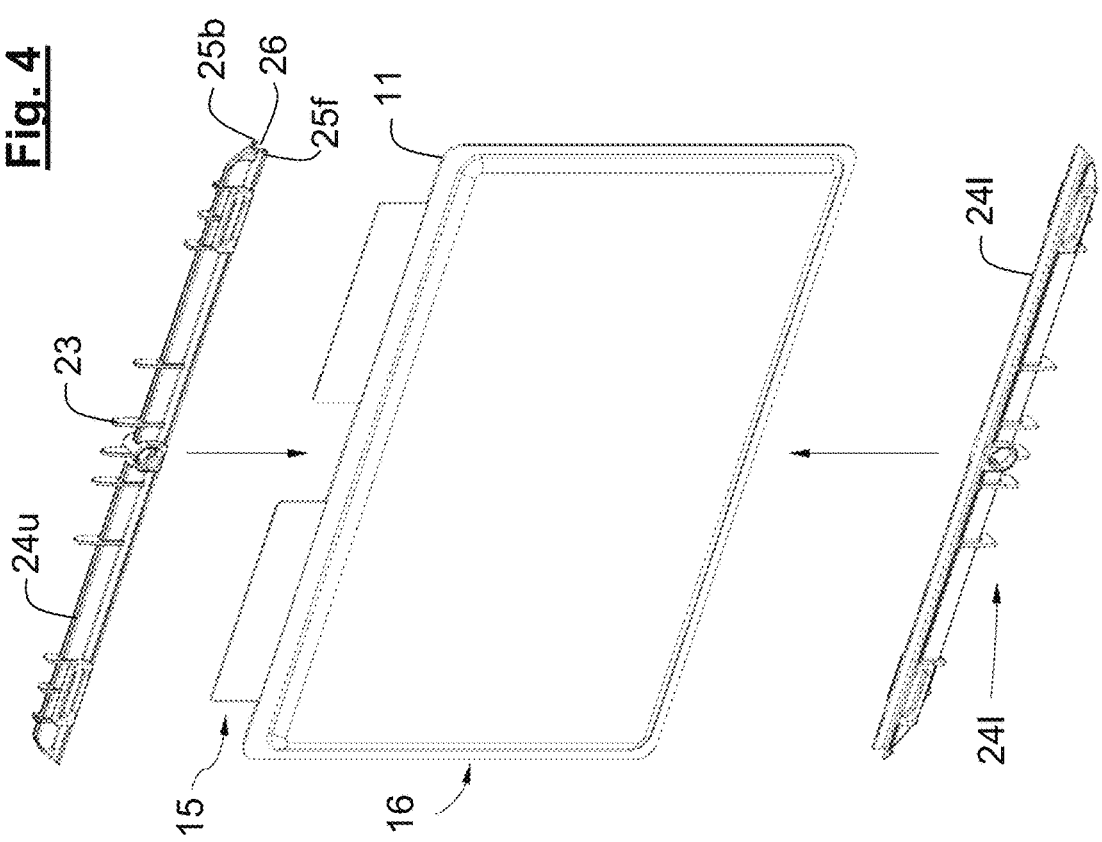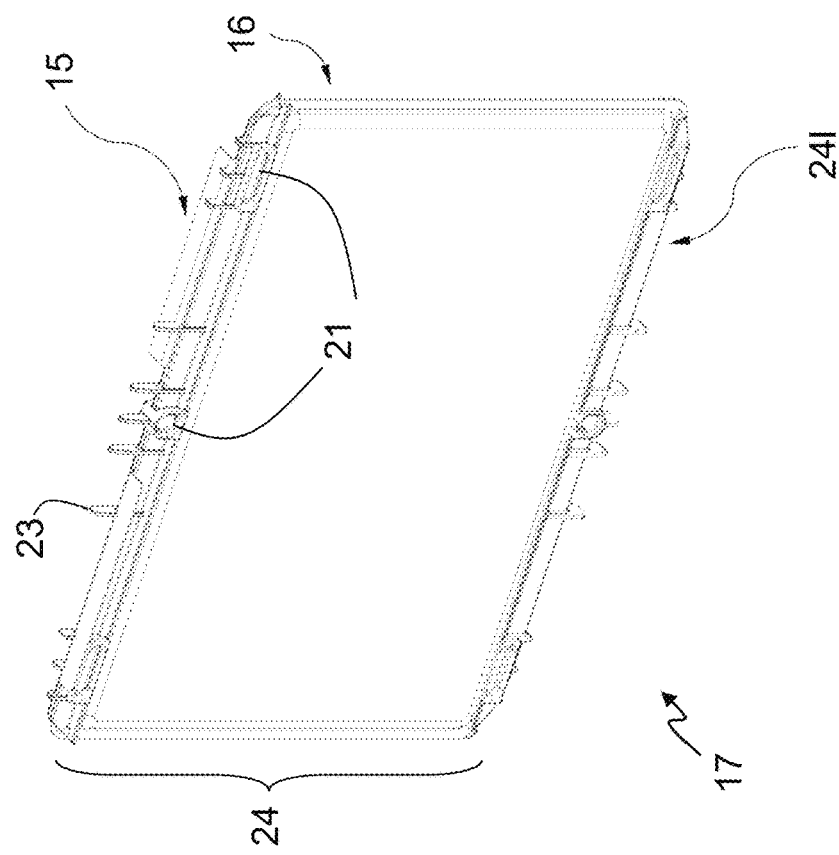

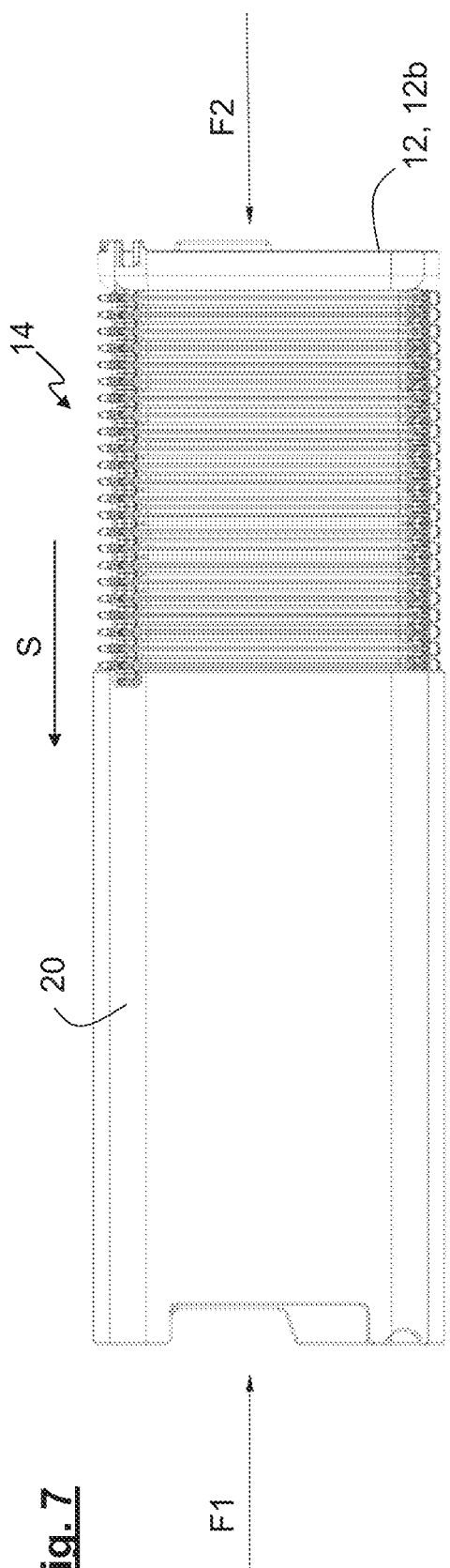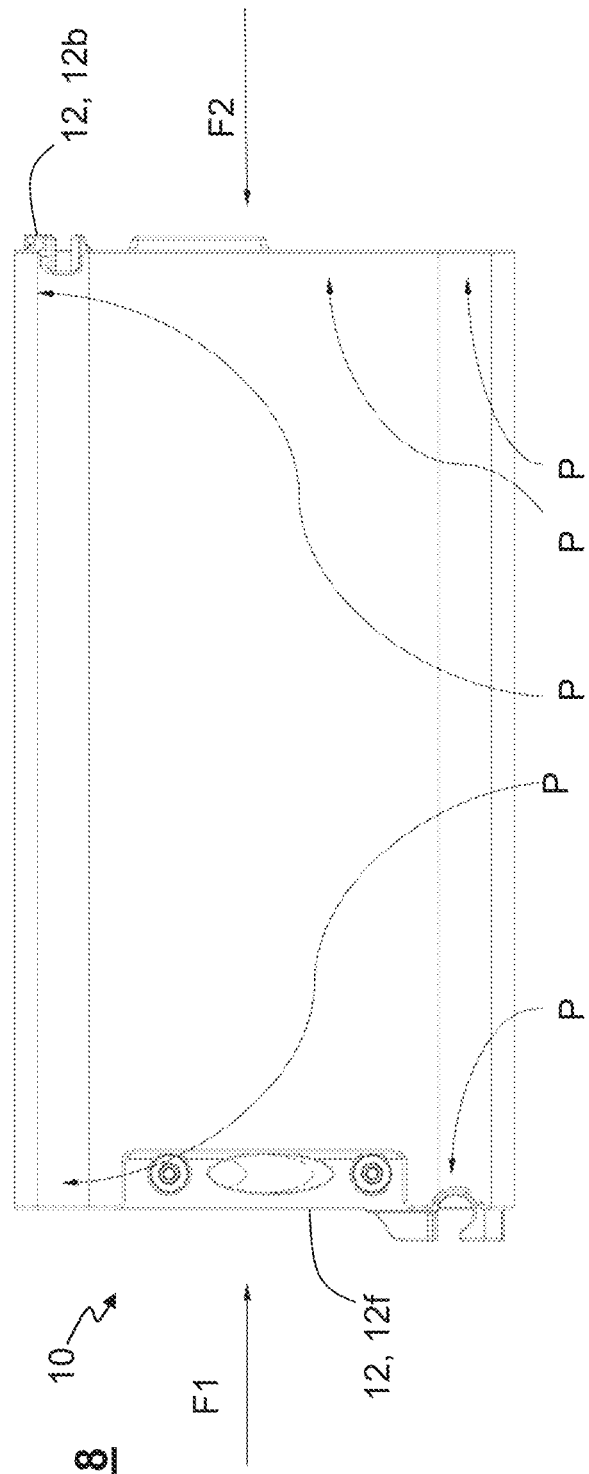

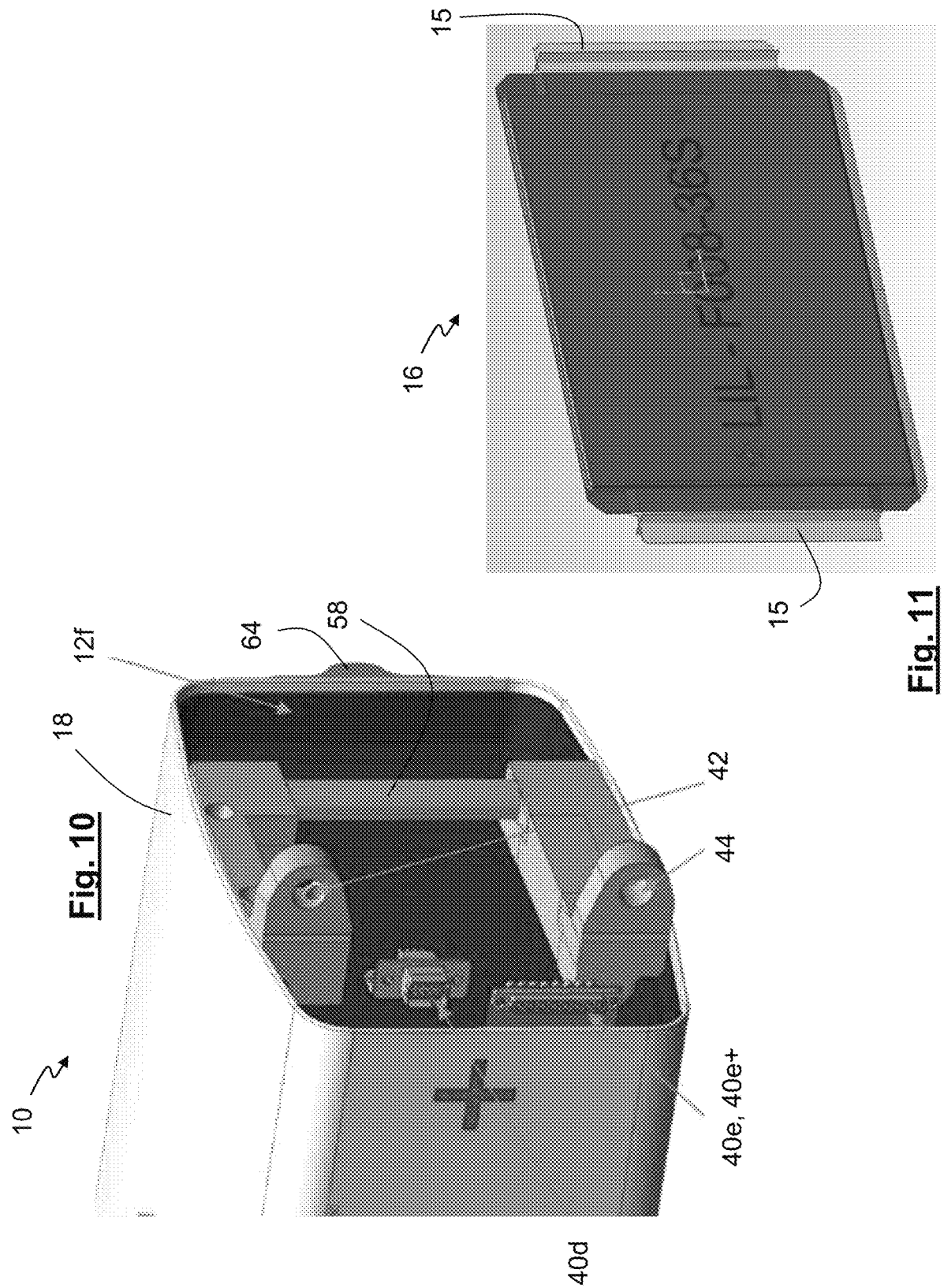

BATTERY MODULE

The present invention relates to a battery module for a vehicle, in particular for an aircraft. An important issue for these battery modules is to ensure adequate safety measures in case of a thermal runaway which some rechargeable batteries such as Li-ion batteries in particular are prone to when damaged.

To be more precise, the present invention relates to a battery module comprising two end plates and a cell stack comprising an arrangement of several interconnected battery cells, in particular pouch cells such as Li-ion pouch cells, that are arranged in a row along a stacking direction, wherein the cell stack is sandwiched between the two end plates in the stacking direction.

Such battery modules are known e.g. from WO 2016/131141 A1. In these battery modules, the end plates and the cell stack are held together by ties or rods connecting the end plates. The known battery modules are surrounded on four sides by cooling elements made from a material with a high heat conductivity.

In order to isolate battery modules from each other in case of an emergency with respect to heat and pressure, it is known to place the individual modules in separate housings that are most often metallic boxes with lids, wherein the known houses are not gas or flame tight as they are assembled into a larger pack structure.

Against this background, the object of the invention is to provide a battery module that is as light-weight as possible, while also improving safety in case of a thermal runaway.

According to the invention, the battery module further comprises a separate tube-like enclosure comprising or being made from a heat insulating material, the tube-like enclosure having a front opening and a back opening that are closed by the end plates so that the tube-like enclosure and the two end plates form a housing in which the cell stack is accommodated.

The form of the resulting housing as a capped tube is better suited to the high pressures occurring during thermal runaway than a lidded box, and the material of the housing can be chosen to be both light-weight and heat resistant.

Furthermore, as described in more detail below, this design allows to compress the end plates and the cell stack sandwiched therebetween while the tube-like enclosure is slid over the cell stack and fixed to the end plates, so that the compression of the cell stack is maintained by the housing even when external forces are relinquished after the enclosure has been fixed to the end plates. In this manner, additional structures for compressing the cell stack can be dispensed with, reducing the weight of the battery module.

In this context, a material is considered to be a heat insulating material if its thermal conductivity is smaller than 0.5 $W(Km)^{-1}$, preferably smaller than 0.1 $W(Km)^{-1}$.

In particular, the tube-like enclosure can comprise a combination of the heat insulating material, which is preferably intumescent, with at least a composite material, preferably a fiber reinforced polymer in order to provide sufficient structural stability while keeping the weight low.

For improved pressure resistance, the tube-like enclosure can be formed in one piece.

The ideal shape for a pressure vessel would a sphere which is however not an efficient use of the limited available space in a vehicle. As an acceptable trade-off between pressure resistance and space management, in particular for a module comprising rectangular pouch cells, the tube-like enclosure can have a rectangular cross-section with rounded edges.

According to an exemplary embodiment, the housing can be pressure tight for pressures up to 4 bar and/or heat resistant for temperatures up to 500° C. or even up to 1000° C. In particular, the housing can be designed to be heat resistant for temperatures up to 500° C. during operation or for longer time periods and for temperatures up to 1000° C. for shorter time periods.

In order to limit peak pressure and allow for a controlled release of pressure from the module in case of an emergency such as thermal runaway, a pressure relief safety device such as a burst disc or a pressure relief valve can be provided, in particular in one or both of the end plates.

In a vehicle, the different battery modules are electrically connected and they are furthermore connected in many cases to a central thermal management system (thermal management system) and/or to a central control system. Therefore, in order to simplify the assembly process, an interface structure can be integrated in an interface portion of at least one of the end plates, wherein the interface portion is exposed to the outside of the battery module when the front opening and the back opening of the tube-like enclosure are closed by the end plates.

The interface structure can comprise at least one of a fluid connector arrangement, an electrical connector arrangement, a data connector arrangement and a pressure relief safety device, preferably several or all of the above. In this manner, one of the end plates, e.g. the front end plate, can have a significant functional integration, comprising electrical connection, thermal management quick connection and tubing, venting and battery management system (BMS) data connection all in a single finished part.

In order to reduce the risk of current carrying elements of the battery module coming into contact with the heat transfer fluid, the electrical connector arrangement and/or the data connector arrangement on the one hand and the fluid connector arrangement on the other hand can be provided in two different interface portions of one of the end plates, wherein the connectors in the two different interface portions are accessible from opposed sides of the battery module.

According to an exemplary embodiment, the tube-like enclosure is fitted over and fixed to the end plates. As described below, this design allows to apply a defined pressure on the cell stack while fitting the enclosure thereover and then to lock the pressure in place by fixing the enclosure to the end plates.

According to an exemplary embodiment, the interface portion is disposed on a peripheral wall of at least one of the end plates, and a front edge or back edge of the tube-like enclosure comprises a recessed portion aligned with the interface portion so that the interface portion is exposed when the tube-like enclosure is fitted over and fixed to the corresponding end plate.

In order to allow for the necessary pressure to be applied to the cells during their lifetime and to account for the natural swelling of the battery cells over time without increasing load on the structure, foam pads and the battery cells can be alternately arranged in the stacking direction in order to form the cell stack, so that each battery cell is sandwiched between two foam pads.

Each battery cell can be disposed in or on a cell frame in order to position the cells within the housing.

These frames can also aid in the cell welding process while locating the cell within the housing and transferring inertial loads.

In addition to pressure regulation, the cell frames can also define a distance between adjacent battery cells in the stacking direction which in turn prescribes a pressure application to the cells based on the corn pression-stiffness curve of the material of the foam pads. As pressure increases beyond a specified limit, the cell frames are loaded in compression rather than transferring the extra pressure to the cell stack.

It is also intended to claim protection for a vehicle, in particular aircraft, comprising a plurality of battery modules according to the invention as described above, the battery modules being arranged in a row along the stacking direction.

Furthermore, the object of the invention is also solved by a method for assembling a battery module, comprising the following steps:
- forming a cell stack comprising an arrangement of several battery cells that are arranged in a row along a stacking direction,
- placing the cell stack between two end plates in the stacking direction,
- applying a pressure, preferably a predefined pressure, to the cell stack by applying opposed forces to the two end plates parallel to the stacking direction, wherein, while the pressure applied to the cell stack is maintained, a tube-like enclosure is fitted over the cell stack and fixed to the two end plates, so that the tube-like enclosure and the two end plates form a housing in which the cell stack is accommodated.

This allows for a controllable assembly process which pre-locates all parts and features with respect to each other. The pressure can be regulated during the assembly process when the cell stack is inserted into the enclosure. Instead of applying a predefined pressure, the stack can be compressed to a predefined length.

According to a particular embodiment, the cells are electrically connected to each other (e.g. in series), preferably by welding, and to an electrical connector arrangement provided e.g. in one of the end plates while the pressure applied to the cell stack is maintained and before the tube-like enclosure is fitted over the cell stack.

After the cells have been electrically connected, while the pressure applied to the cell stack is maintained and before the tube-like enclosure is fitted over the cell stack, the method can comprise one or both of the following two steps:
- providing an internal channel system so that it is in thermal contact with the cell stack, in particular with the cell tabs, and connecting the internal channel system to a fluid connector arrangement provided in one of the end plates,
- providing an electronic module and connecting the electronic module to an electrical connector arrangement and/or data connector arrangement provided in at least one of the end plates. The electronic module can e.g. be a BMS slave module comprising electronic circuitry and preferably several sensors for e.g. temperature and/or pressure and/or voltage.

At this stage, sensors, in particular temperature sensors and/or voltage sensors, can also be welded to the battery cells.

In order to lock the pressure in place, the tube-like enclosure can fixed to the two end plates by match drilling and providing suitable fasteners in the resulting holes of enclosure and end plates while the pressure applied to the cell stack is maintained.

The resulting battery module is capable of surviving or at least of mitigating the effects of thermal runaway while also being lightweight and mass producible in quantities of thousands or hundreds of thousands of modules.

In particular, the propagation of thermal runaway between the modules can be prevented, thus protecting the aircraft and the passengers. The low weight minimizes cell overhead to maximize travel range. Furthermore, the solution according to the invention has a reduced number of parts and is structurally less complex than the known solutions.

Finally, the battery modules according to the invention can achieve all of the above criteria while also being certifiable for aerospace applications.

In the following, the present invention is explained in more detail by way of an exemplary embodiment illustrated in the appended figures. Therein:

FIG. 3 is a perspective view of a battery cell unit of the battery module of FIG. 1.

FIG. 4 is an exploded view of the subject-matter of FIG. 3,

FIGS. 5-8 are side views illustrating several stages of assembling the battery module of FIG. 2, FIG. 10 is a perspective view of a front end portion of the embodiment of FIG. 9, and FIG. 11 is a perspective view of a battery cell as used in the embodiment of FIGS. 9 and 10.

In the Figures, a longitudinal direction of the battery module 10 is denoted by x, a lateral direction by y and a vertical direction b z, the directions relating to a battery module in a normal installation position in a vehicle standing on a horizontal ground.

Figure 1:
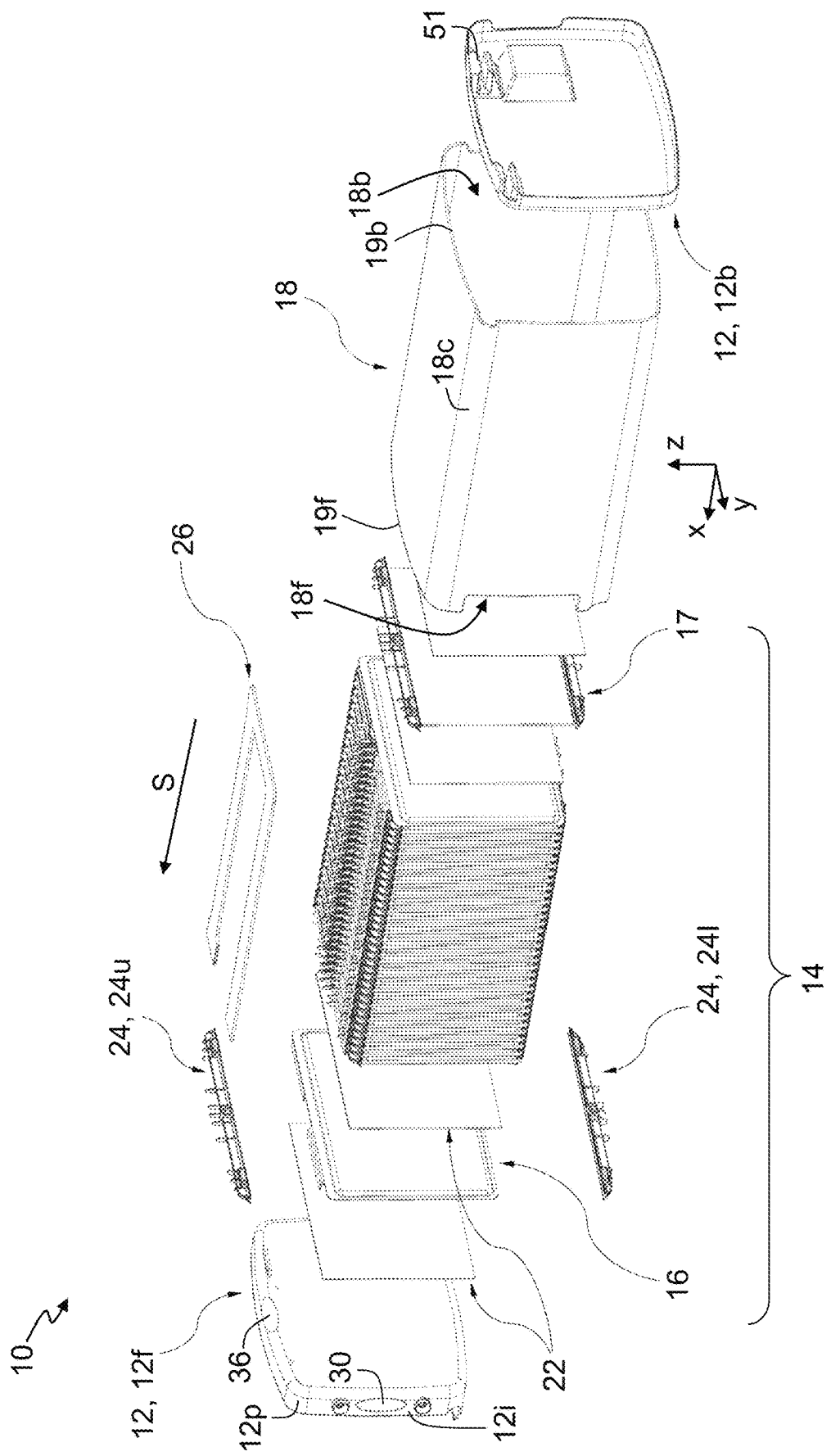
FIG. 1 is an exploded perspective view of a battery module according to an embodiment of the invention.

The battery module 10 illustrated in FIG. 1 comprises a cell stack 14 which, according to the invention, is accommodated within a housing 20 (shown in FIG. 2) formed from a tube-like enclosure 18, a front end plate 12f and a back end plate 12b, the two end plates 12 closing a front opening 18f and a back opening 18b of 10 the enclosure 18.

The longitudinal or axial direction x of the enclosure 18 coincides with the stacking direction S of the cell stack 16 comprising an arrangement of alternately provided battery units 17 and foam pads 22 arranged in a row along the stacking direction S between the two end plates 12.

In the illustrated embodiment, each of the battery units 17 comprises a battery cell 16 and a corresponding cell frame 24 which, in the present example, is configured from an upper frame part 24u and a lower frame part 24l. However, also cell frames surrounding the battery cell on one, three or four sides are conceivable.

The battery cells 16 in the present example are rectangular Li-ion pouch cell with two cell tabs 15 both provided on the upper side of the respective cell.

For tab cooling, a rather flat, U-shaped internal channel system 26 is provided on the upper side of the cell stack 14 so that it is in thermal contact with the cell tabs 15. The internal channel system 26 is connected at both ends to a fluid connector arrangement 40c for connecting the battery module 10 to an external thermal management system.

The enclosure 18 has a rectangular cross-section with rounded corners 18c to optimize the trade-off between volume packing efficiency and pressure resistance.

Furthermore, the enclosure 18 is made in one piece from a light-weight yet structurally stable and heat resistant material, in particular from a combination of at least a composite material such as a glass-fiber reinforced polymer and at least a heat insulating material.

In particular, the enclosure can have a layered structure comprising a fiber-reinforced composite layer and a heat insulating, preferably intumescent, coating. Optionally, also a metallic mesh can be provided in the enclosure.

The end plates 12 can also comprise or be made of a composite material and can in particular be made from a material similar or identical to that of the enclosure 18.

The structure and composition of the housing 20 as a combination of composite materials and insulation materials helps to contain the elevated thermal runaway temperatures and pressures, the walls of the housing acting as fire walls preventing damage and propagation of the reaction to other modules or parts of the vehicle in which the module is installed.

Figure 2:
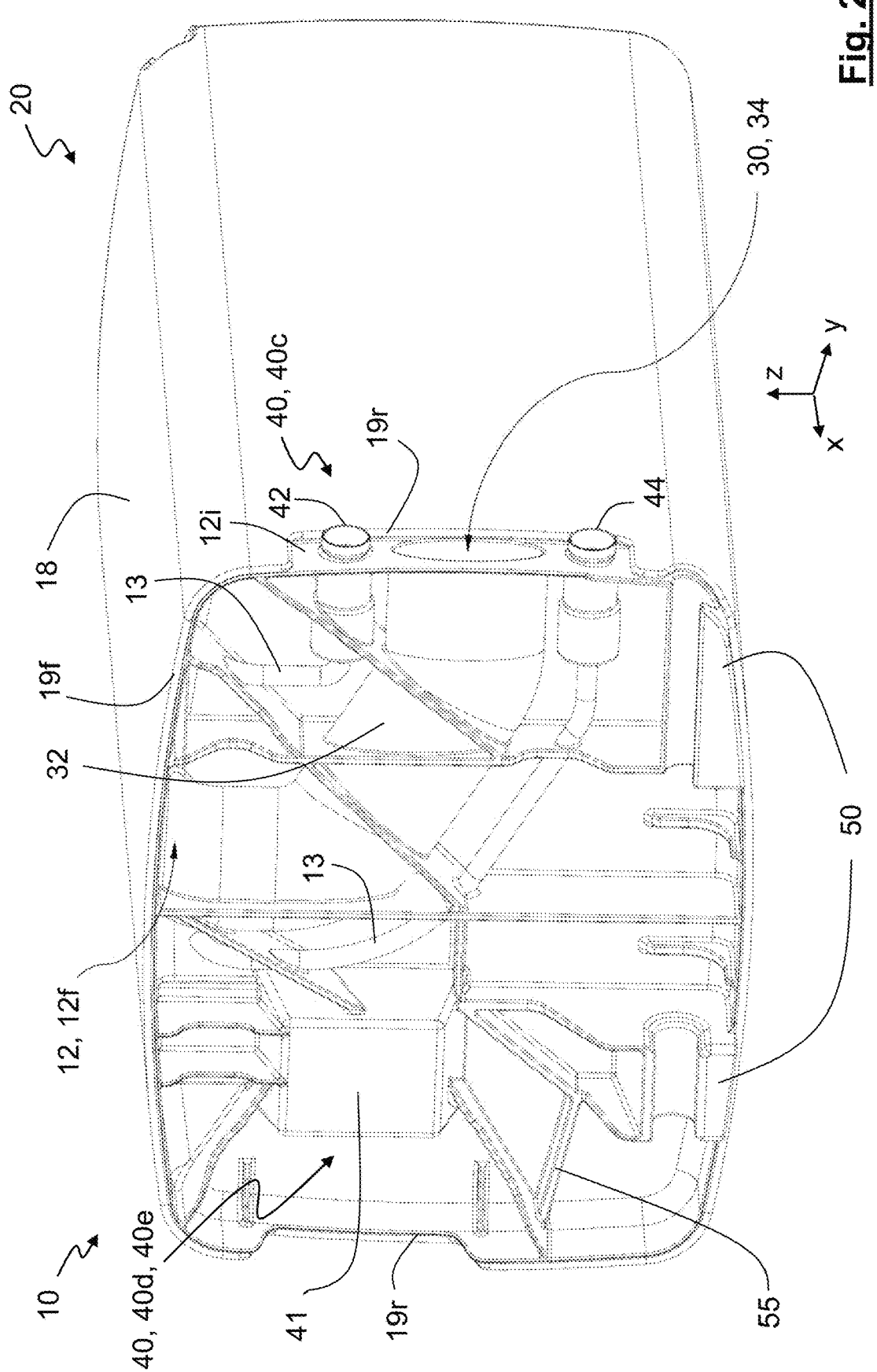
FIG. 2 is a perspective view of the battery module of FIG. 1 in an assembled state.

FIG. 2 shows the battery module 10 in an assembled state and shows in particular the front plate 12$f$ in more detail.

Two fluid lines 13 are embedded into the front plate 12$f$ for connecting the internal channel system 26 to the fluid inlet connector 42 and the fluid outlet connector 44 of the fluid connector arrangement 40$c$. The fluid connectors 42, 44 are preferably self-sealing, dripless, push-to connect connectors.

Between the fluid connectors 42 and 44, a pressure relief safety device 30 in the form of a burst disk is provided. The pressure relief safety device 30 is arranged in a vent outlet 34 of a vent channel 32 embedded in the front plate 12$t$ and connected to a vent inlet 36 arranged on a back side of the front plate 12$f$ that is shown in FIG. 1.

If, in the case of a thermal runaway, the pressure inside the housing 20 exceeds a given threshold, the pressure relief safety device 30 opens so that the pressurized gas can leave the battery module 10 in a controlled manner. The vent outlet 34 can be connected to an external venting system (not shown).

The fluid connectors 42 and 44 as well as the pressure relief safety device 30 are arranged in an interface portion 12$i$ of a peripheral wall 12$p$ or, to be more precise, a right side wall of the front end plate 12$f$ in FIG. 2. The interface portion 12$i$ is aligned with a recessed portion 19$r$ of a front edge 19$f$ defining the front opening 18$f$ of the enclosure 18, so that the interface portion 12$i$ is exposed and the fluid connectors 42, 44 and the pressure relief safety device 30 can be accessed from the side along the lateral direction y when the module 10 is assembled.

In order to fix the battery module 10 to the vehicle, a guide rail 50 e.g. for a cylindrical mounting pin of an external mounting bracket (not shown) can be provided in a lower part of the front end plate 12$f$, and a similar guide rail 51 can be provided in an upper part of the back end plate 12$b$ as shown in FIG. 1. The guide rails 50, 51 and the fluid connectors 42, 44 which are preferably push-to connect connectors, can be oriented in parallel to each other, in the present example along the y-direction so that the battery module 10 can be attached to the vehicle and connected to the thermal management system at the same time by sliding the battery module onto the corresponding mounting bracket.

Furthermore, an electrical connector arrangement 40$e$ and/or data connector arrangement 40$d$ can be provided in the front end plate 12$f$ and be accommodated in a connector housing 41 so that the electrical connector arrangement 40$e$ and/or data connector arrangement 40$d$ on the one hand and the fluid connector arrangement 40$c$ on the other hand are accessible from opposed sides of the module which reduces the risk of damaging the electronic components of the battery module 10 by contact with heat transfer fluid.

Finally, the front end plate 12$f$ can comprise an arrangement of reinforcement ribs 55 for increasing the stability and holding the different elements of the front end plate 12$f$ in place. Preferably, the reinforcement ribs 55, the guide rail 50 and the connector housing 41 are formed in one piece.

An exemplary battery unit 17 of the battery module 10 is shown in more detail in FIGS. 3 and 4. As explained above, each battery unit 17 comprises a battery cell 16 and a cell frame 24 comprising a lower cell frame part 24$l$ and an upper cell frame part 24$u$ that can be largely identical.

The frame parts 24$u$, 24$l$ have an elongate form and comprise a front plate 25$f$ and a back plate 25$b$ defining a small slit 26 therebetween into which the cell tabs 15 and a flat circumferential edge region 11 of the battery cell 16 are introduced in order to assemble the battery unit 17 as indicated in FIG. 4.

In the region of the cell tabs 15, the front plate 25$f$ and the back plate 25$b$ are not joined so that the cell tabs 15 can protrude from the resulting opening (not visible) in the upper frame part 24$u$ and can be folded over the upper frame part in opposing directions as shown in FIG. 3. In this manner, adjacent battery units 17 can be arranged in such a manner that their cell tabs 15 overlap and contact each other in order to electrically connect the battery cells 16 in series. Additionally or alternatively, the cell tabs 15 of the different modules can be welded together or electrically connected in any other suitable manner.

The cell frame 24 comprises an arrangement of several locator pins 23 protruding from the upper side of the upper cell frame part 24$u$ and from the lower side of the lower cell frame part 24$l$.

In a central region of the cell frame 24, there are several locator pins 23 having the same length, whereas in the outer lateral regions of the cell frame 24, the lengths of the locator pins 23 decrease with increasing distance from the center, in correspondence with the rounded edges 18$c$ of the enclosure 18. In this manner, the locator pins 23 serve to position and center the battery units 17 within the housing 20 while leaving enough space between the battery units 17 and the enclosure 18 so that in case of a thermal runaway, the resulting gases can leave the housing via the vent channel 32.

Furthermore, in the region of the cell tabs 15, suitable parts of the locator pins 23 are used to hold down the respective cell tab 15. As an aside, it is noted that in order to connect adjacent battery cells 16 in series as indicated above, two different kinds of upper frame parts 24$u$ may be used, one allowing the left cell tab to be folded to the front and allowing the right cell tab to be folded to the back (as shown in FIG. 3), and the other allowing the left cell tab to be folded to the back and allowing the right cell tab to be folded to the front.

Finally, the cell frames 24 comprise an arrangement of key and slot structures 21 configured to engage with corresponding key and slot structures 21 of adjacent cell frames 24 in order to position the battery units 17 with respect to each other when forming the cell stack 14.

Figure 6:
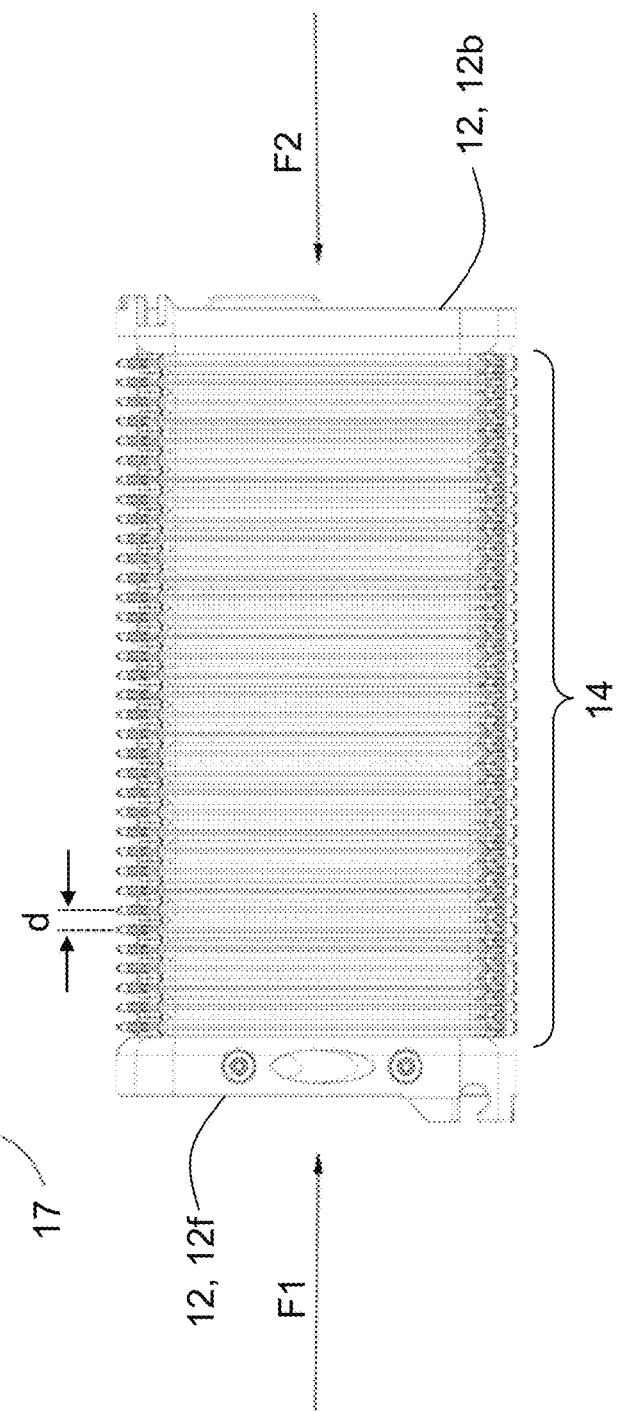

As, in the assembled battery module 10, adjacent cell frames 24 contact each other, they define a distance d in the stacking direction S (cf. FIG. 6).

Now, a method for assembling a battery module according to an embodiment of the present invention will be explained with reference to FIGS. 5 to 8.

Figure 5:
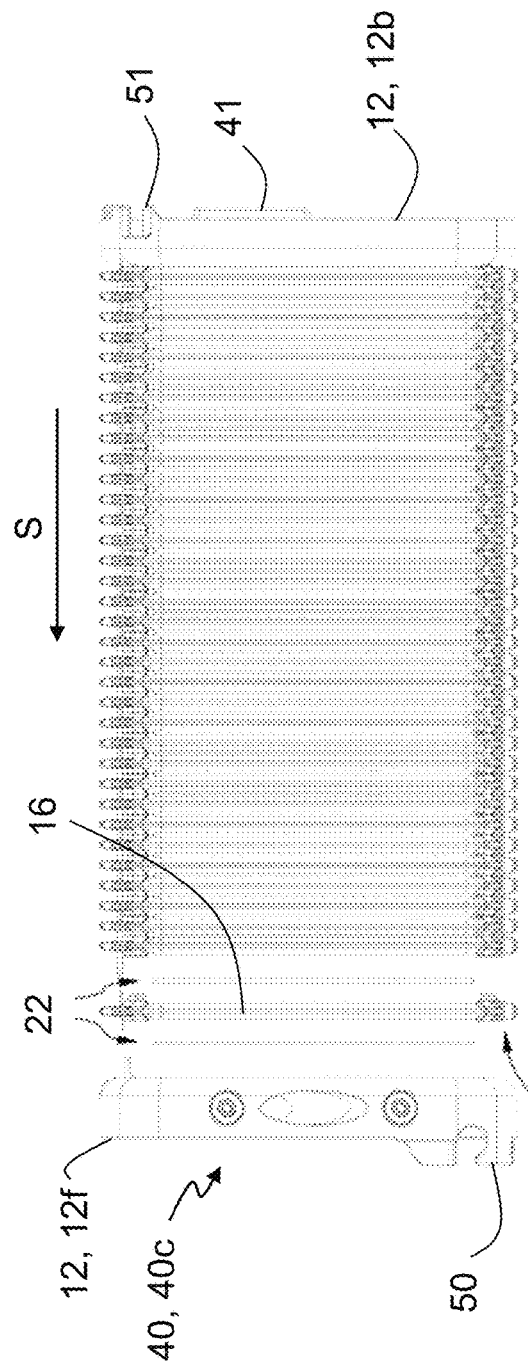

In a first step illustrated in FIG. 5, the cell stack 14 is assembled by alternating foam pads 22 and battery units 17 in a row along the stacking direction S so that each battery unit 17 is sandwiched between two foam pads 22, and the resulting cell stack 14 is arranged between the front plate 12f and the back plate 12b, the end plates 12 thus closing the cell stack in the stacking direction S. If desired, the foam pads 22 can be at least temporarily fixed to the battery units by a suitable adhesive.

In a second step illustrated in FIG. 6, opposing compressing forces F1 and F2 are applied to the front plate 12f and the back plate 12b in order to apply pressure, preferable a defined pressure, to the cell stack 14. As an alternative, the stack may be compressed to a predefined length. The Pre-compression of the cells is a result of the tolerance of the foams and cells. The stack may be designed to provide a cell compression of no less than 25 psi and no more than 50 psi.

Now, the battery cells 16 can be electrically connected together, e.g. by welding, and can be electrically connected to the electrical connector arrangement 40e, the cooling channel 26 and electronic components such as a BMS slave module can be installed and sensors can be welded to the battery cells, all while the pressure is being maintained.

Afterwards, as illustrated in FIG. 7, the enclosure 18 is slid over the cell stack 14 while the compression on the end plates 12 is maintained.

Finally, as illustrated in FIG. 8, the enclosure 18 is attached to the end plates 12 by match drilling and providing fasteners in the resulting holes in different places P around the perimeter of the housing 20 where the enclosure 18 overlaps the peripheral wall 12p of the end plates 12. During this entire process, the pressure applied to the cell stack is maintained and thus locked into place by fixing the enclosure 18 to the end plates 12, even when the external forces F1, F2 applied to the end plates 12 are relinquished.

Figure 9:
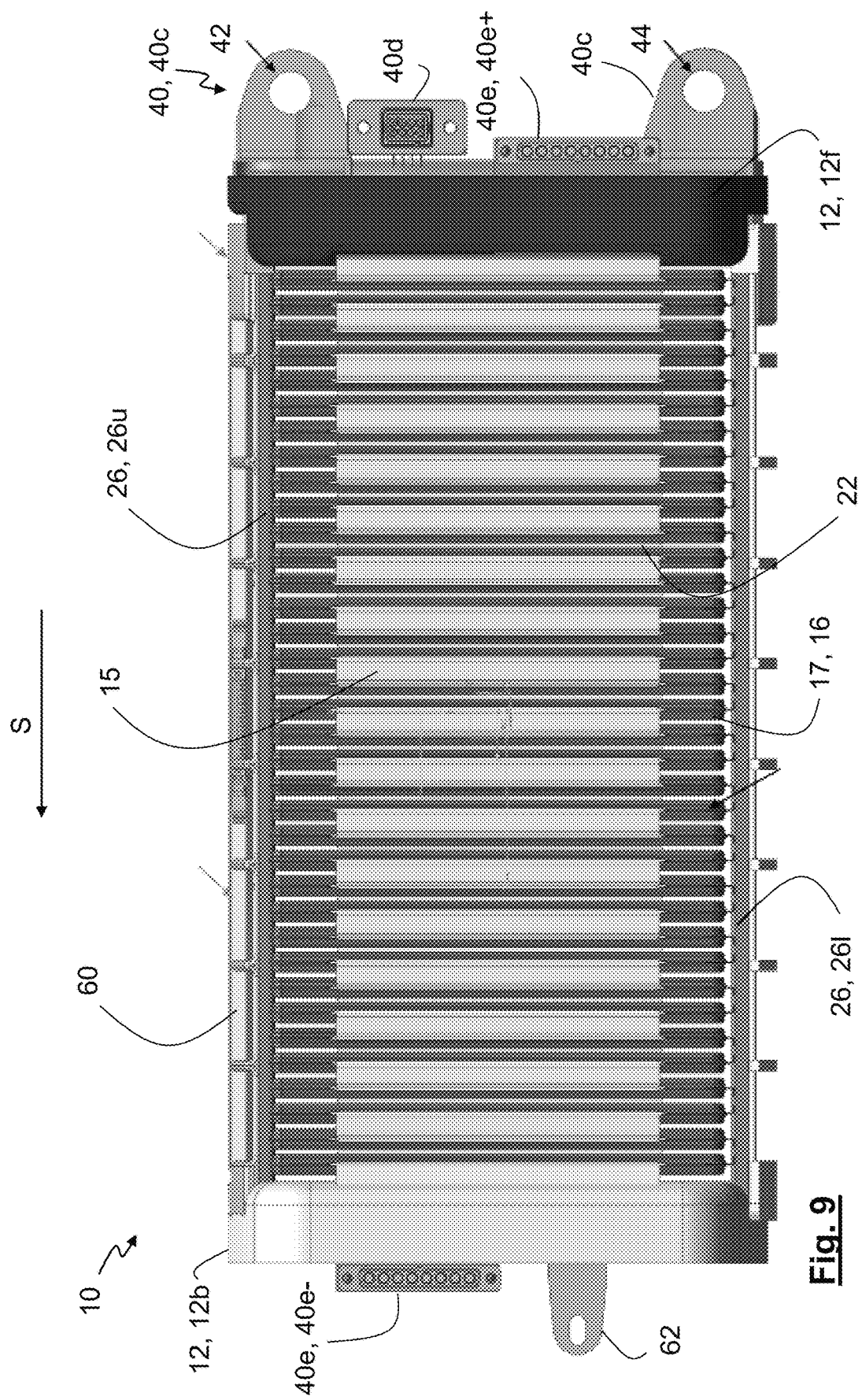
FIG. 9 is a side view of parts of a battery module according to a further embodiment of the invention.

FIGS. 9 to 11 illustrate a battery module 10 according to a further embodiment of the invention or at least parts thereof.

Features of the embodiment of FIGS. 9 to 11 that correspond to those of the first embodiment as illustrated in FIGS. 1 to 8 are provided with the same reference signs as the corresponding features of the first embodiment.

In the following, the further (second) embodiment will primarily be described in more detail only in as far as it is different from the first embodiment. Otherwise, reference is made to the description of the first embodiment as provided above.

In the side view of FIG. 9, the enclosure 18 (cf. FIG. 10) is omitted in order to show the interior structure of the cell stack 14 comprising alternatingly provided battery units 17 and foam pads 22 stacked and interposed between two end plates 12 in the stacking direction S. As in the first embodiment, the battery cells 16 of the battery units 17 are also rectangular Li-ion pouch cells.

However, in contrast to the first embodiment, the two cell tabs 15 of each battery cell 16 of the second embodiment are not provided on the upper side but on opposite lateral sides of the cell 16 as shown more clearly in FIG. 11. This cell type is also called opposite sided tabs cell.

Having tabs on opposite sides allows for bigger tabs, thus reducing the electrical resistance of the cells 16. Furthermore, it has been found to reduce the likelihood and/or the extent of temperature hot spots during use. Overall, using opposite sided tabs cells may increase the thermal performance of the cells.

Furthermore, it can be provided that the battery units 17 do not comprise a cell frame in this embodiment. The stack alignment may be provided by external tools during assembly and may be maintained due to the pressure locked into place as described with reference to FIGS. 5-8 and/or by additional structures within e.g. the enclosure (not shown).

The internal channel system 26 of the second embodiment comprises an upper channel system 26u (upper cooling plate) and a lower channel system 26l (lower cooling plate) provided on the upper and on the lower side of the cell stack 14 so that it is in thermal contact with the upper and lower sides of the battery cells 16 respectively. The thermal contact may be created or intensified by means of heat conductive paste.

Cooling fluid may be fed to the internal channel system 26 through the front end plate 12f by the fluid inlet connector 42. Then, the cooling fluid may loop inside the upper channel system 26u to cool the cell stack 14 from above before returning to the front end plate 12f and being directed to the lower channel system 26l via cooling bypass 58 (cf. FIG. 10). After having looped inside the lower channel system 26l to cool the cell stack 14 from below, the cooling fluid may return to the front end plate 12f and exit through the fluid outlet connector 44.

In contrast to the first embodiment, the fluid connectors 42, 44 of the second embodiment are not provided in a circumferential wall of the front end plate 12f but protrude from the front wall thereof. Nevertheless, similar to the first embodiment, the fluid connectors 42, 44 may be oriented i.e. along the y-direction so that they are accessible from a peripheral side of the housing 18 or, in other words, they are oriented in parallel so that their connection direction is perpendicular to the stacking direction S and is in particular horizontal. This may also apply to the data connector arrangement 40d and/or to the electrical connectors 40e as illustrated in FIGS. 9 and 10

In particular, the fluid inlet and outlet connectors 42, 44 of the fluid connector arrangement 40c may be provided in the form of banjo fittings. These fittings may also be used, e.g. together with other attachment structures 62, 64 indicated in FIGS. 9 and 10, in order to attach the battery module 10 to the aircraft.

For electrical connection, the cell tabs 15 are connected, e.g. welded, to busbars (not shown) that are connected to the electrical connector arrangement 40e which may comprise e.g. a positive terminal 40e+ provided in the front end plate 12f and a negative terminal 40e− provided in the back end plate 12b. The module 10 may comprise e.g. 36 Li-ion battery cells 16 connected in series.

A cell surveillance circuit (CSC) board 60 may be attached e.g. to the upper cooling channel system 26u. This CSC board 60 (or electronic module) monitors the temperature and voltage of the different cells 16 and transfers this information via the data connector 40d e.g. to an external battery management system. The CSC board 60 may be connected to the cell tabs 15 e.g. by two flex circuits welded to each tab pair.

The assembly process of the battery module of FIGS. 9-11 corresponds to that described above with respect to FIGS. 5-8. In particular, the cell stack 14 including the two end plates 12f, 12b is arranged and externally compressed in a predefined manner along the stacking direction S. While the external compression is being maintained, the cell tabs 15 are welded to busbars which are in turn connected to the electrical connector arrangement 40e. Sensor flexes may also be welded to the tabs. Then, the cooling channels 26u, 26l may be installed and the CSC board 60 may be assembled to the upper channel system 26u.

The enclosure 18 is slid over the assembled elements and mechanically fixed to the end plates 12 while the external pressure is being maintained. Then, the external pressure is released and carried over (locked in place) by the enclosure 18.

In comparison, in the prior art, cells are typically installed into an enclosure and are welded or otherwise joined while in the enclosure which involves considerably more effort than the solution proposed by the present invention.

Alternatively, the cells can be built into a preassembly and inserted into the housing with a separate structure applying pressure to the cell stack which increases the weight and the number of different parts of the resulting module Overall, in comparison to conventional battery modules with metallic enclosures, the housing of a module according to the invention is significantly less heavy and conducts heat less readily, thus reducing the ability for thermal runaway to propagate.

The invention claimed is:

1. A battery module for a vehicle, the battery module comprising two end plates and a cell stack comprising an arrangement of several interconnected battery cells that are arranged in a row along a stacking direction(S), wherein the cell stack is sandwiched between the two end plates in the stacking direction(S), wherein the battery module further comprises a separate tube-like enclosure comprising a heat insulating material, the tube-like enclosure having a front opening and a back opening that are closed by the end plates, so that the tube-like enclosure and the two end plates form a housing in which the cell stack is accommodated, wherein the tube-like enclosure is fitted over and fixed to the end plates, the tube-like enclosure being fixed to a peripheral wall of each of the end plates by means of fasteners provided in holes provided in different places around the perimeter of the housing where the tube-like enclosure overlaps the peripheral wall of each of the end plates, each peripheral wall extending in parallel to the stacking direction, wherein the maximum cross-sectional area of at least one of the end plates is smaller than a minimum cross-sectional area of an interior space of that region of the enclosure in which the end plates and the cell stack are arranged.

2. The battery module according to claim 1, wherein the tube-like enclosure comprises a combination of the heat insulating material which is intumescent with at least a composite material comprising a fiber reinforced polymer.

3. The battery module according to claim 1, wherein the tube-like enclosure is made in one piece.

4. The battery module according to claim 1, wherein the tube-like enclosure has a rectangular cross-section with rounded edges.

5. The battery module according to claim 1, wherein the housing is pressure tight for pressures up to 4 bar and/or heat resistant for temperatures up to 500° C.

6. The battery module according to claim 1, wherein the housing comprises a pressure relief safety device, wherein the pressure relief safety device is arranged in one of the end plates.

7. The battery module according to claim 1, wherein an interface structure is provided in an interface portion of at least one of the end plates, wherein the interface portion is exposed to the outside of the battery module when the front opening and the back opening of the tube-like enclosure are closed by the end plates.

8. The battery module according to claim 7, wherein the interface structure comprises at least one of a fluid connector arrangement, an electrical connector arrangement, a data connector arrangement and a pressure relief safety device.

9. The battery module according to claim 7, wherein the interface portion is disposed on the peripheral wall of at least one of the end plates, and wherein a front edge or back edge of the tube-like enclosure comprises a recessed portion that is recessed in the stacking direction and aligned with the interface portion so that the interface portion is exposed when the tube-like enclosure is fitted over and fixed to the corresponding end plate.

10. The battery module according to claim 1, wherein, in order to form the cell stack, foam pads and the battery cells are alternately arranged in the stacking direction(S) so that each battery cell is sandwiched between two foam pads.

11. The battery module according to claim 10, wherein each battery cell is disposed in or on a cell frame, wherein the cell frames define a distance (d) between adjacent battery cells in the stacking direction(S).

12. A vehicle comprising a plurality of battery modules according to claim 1 arranged in a row along the stacking direction(S).

* * * * *